June 28, 1949.　　F. H. TEMPLETON　　2,474,557
COMBINE HARVESTER
Filed June 2, 1944　　2 Sheets-Sheet 1
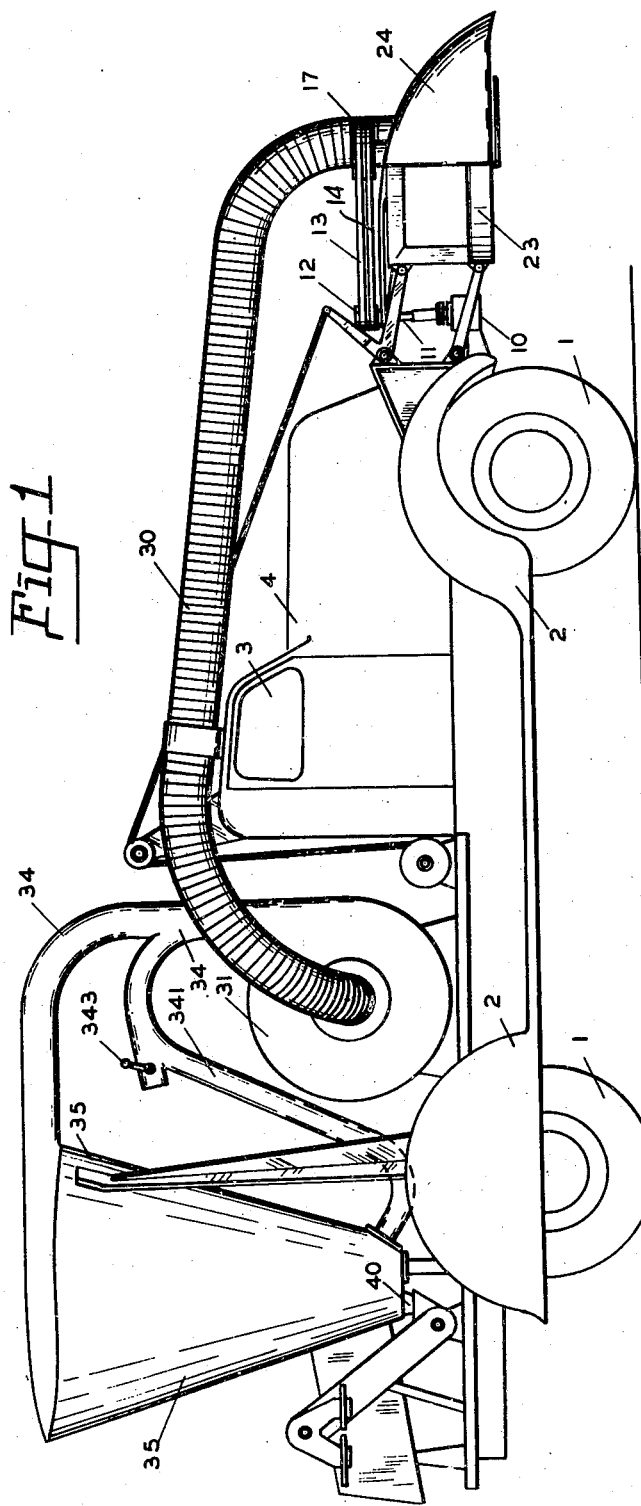
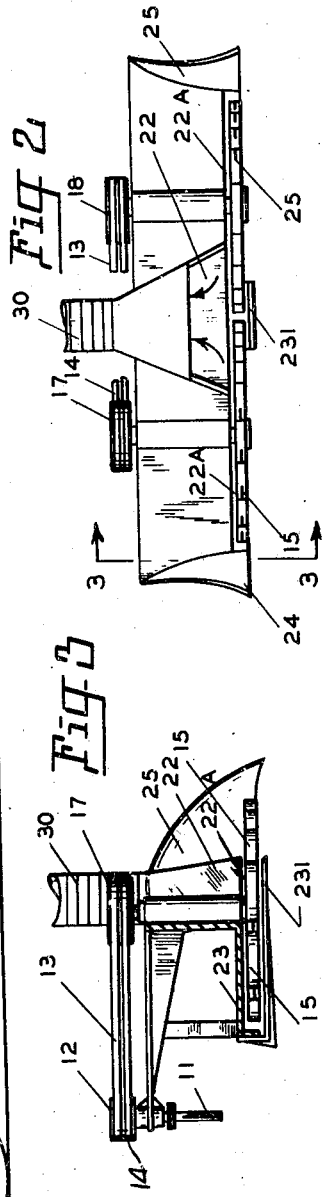
INVENTOR
FRED H. TEMPLETON
By
G. F. McDougall.
ATTORNEY

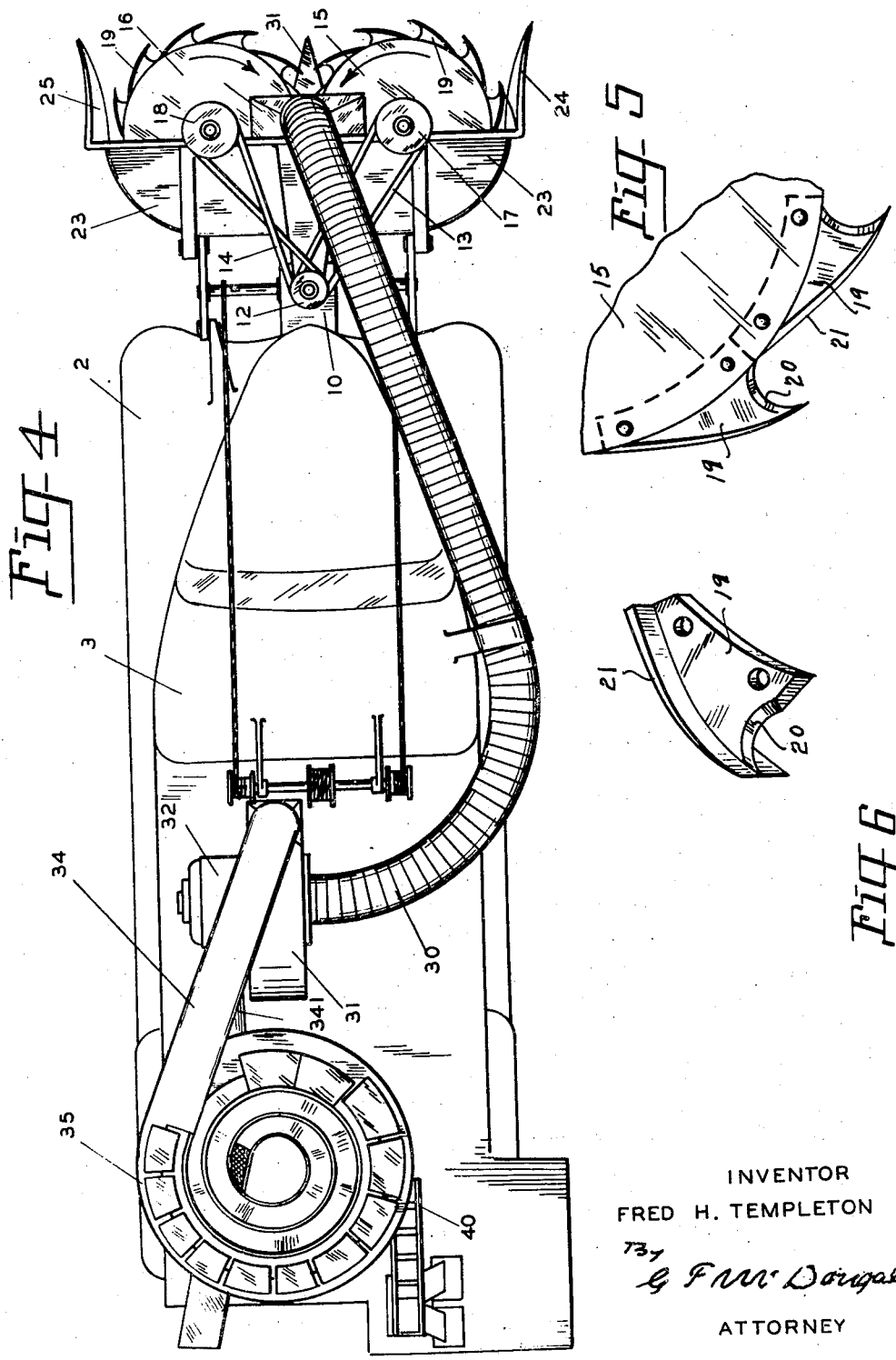

Patented June 28, 1949

2,474,557

UNITED STATES PATENT OFFICE 2,474,557

COMBINE HARVESTER

Fred H. Templeton, Portland, Oreg., assignor to Templeton Harvester, Inc., Oakland, Calif., a corporation of California Application June 2, 1944, Serial No. 538,398

7 Claims. (Cl. 56—122)

1

The present invention relates to what is known to grain growers as a "combine," meaning a reaper of the header type which cuts the ripened grain high on the straw and delivers the heads with some straw to a thresher, the grain, after separation, being either sacked or delivered to a tank-truck for conveying to storage.

"Combines" have superseded the self-binder that was earlier, for large scale grain harvesting but are, as a rule, an aggregation of the earlier reaper with a thresher. Owing to the concurrent threshing, the combine must necessarily harvest grain that will thresh readily and cleanly, the penalty being heavy loss. Since the reel, the reciprocating sickle and the canvas aprons of the binder have been carried over to the combine and are grain shellers, and wasters, it has long been recognized that something should be done. It is, therefore, the primary object to supply effective substitutes for the named instrumentalities, that may shell abundantly in performing their grain gathering functions, but which do not throw grain to the ground to be irretrievably lost.

It is a further object to provide a combine that will safely harvest dead ripe wheat or oats when there is a hot dry wind blowing and actually do its finest and most economical work under these conditions.

These named and other objects that will be apparent, constitute the purposes of my invention.

An embodiment of the machine of the invention, which may be in part considered diagrammatic, will show the new instruments and serve in explaining the principle of the invention, of which they are necessary components.

There are three fundamentally new elements, thought to have never before been considered in a harvesting or threshing machine. First a pair, or groups of pairs, of circular saws with hooked teeth (preferably) to actually sever the heads from the standing straw; second, upstanding curved vanes secured to the upper surface of the saws to neutralize the natural windage generated by a running saw disc and to give an impulse to heads of grain and loose kernels that may be shelled in cutting, to impart centripetal force to them that is superior to the friction generated centrifugal force from the running saw blade and a suction nozzle positioned to receive the incoming grain and deliver it to a threshing machine.

The threshing machine is another entirely new departure from the old art of grain harvesting

2 comprising an encased high speed blower with auxiliaries, of which the suction nozzle is one, together with other parts to be hereinafter described. The threshing is done mostly by impact principle and does not tend to crack kernels of grain; which is a fault, though not a particularly serious one, that accompanies use of the conventional toothed cylinder with its concaves.

It is the total object of this invention, therefore, to provide grain growers with a more effective and more economical grain harvesting machine than is now available to them.

The invention resides in the employment of new and old structures in new combinations to constitute a combine harvester as more clearly and distinctly pointed out in the claims.

To further illustrate and describe the invention and make its principle and laws of operation clearer than has been done in the foregoing statement, drawings have been made, and accompany this specification, in part diagrammatic, to illustrate the invention in its best form as I now contemplate making it. This form and the description that accompanies it are not to be regarded as limiting the invention or fixing its scope, but for the purpose stated.

In the drawings:

Fig. 1 is a side elevation of my new combine harvester as it has been built and tested;

Fig. 2 is a front view, in detail, showing the important new substitute for a reciprocating sickle of the old art;

Fig. 3 is a section of Fig. 2 on the line 3—3 of Fig. 2;

Fig. 4 is a top or plan view of the structure shown in Fig. 1;

Fig. 5 is a broken away segment of one of the cutting saws, so named because of the resemblance to a saw;

Fig. 6 is a single one of the detachable teeth of the saw, showing the upstanding vane referred to in the introductory statement to overcome natural windage and impart centripetal force to shelled grain and severed heads.

The actual separation of the threshed grain from the straw and chaff will form the subject matter of a separate application.

Figures 5 and 6 are drawn to a somewhat larger scale than other figures; dimensions, however, are not intended to be indicated here or elsewhere in the drawings.

All of the foregoing views will be hereinafter fully explained as an operative embodiment of my invention to explain the principles involved and laws of operation that apply; but it is not to be regarded as having other functions, such as limiting the scope of the invention, which is the purpose of the appended claims.

Further describing the drawings:

The combine harvester is preferably mounted on an automotive vehicle and is so shown, the vehicle being indicated by the wheels 1, vehicle 2, cab 3 and motor hood 4, which will enclose a motor which will be assumed to be present though not seen.

Carrying out the description of the instrumentalities stated supra to be entirely new in grain harvesting, the motor of the vehicle operates a power take-off 10 to which is coupled a jointed shaft 11, which is so constructed and arranged that a limited up and down movement of said shaft 11 is made possible. Attached to the shaft 11 is a grooved belt pulley 12, which drives the V belts 13 and 14 and which in turn impart rotary motion to the saws 15 and 16 by virtue of the pulleys 18 and 17. This transmission is diagrammatic and of course many effective substitutes may be constructed by the designing engineer. The saws are shown as running together, like meshed gears but by pitching the cutting teeth such as 19 and spiral vanes 21 alike, the saws may run in the same direction.

The combined width of the saws across their faces is much less than the length of the cutter bar of an ordinary "combine" of the old art, but this new one can be enlarged over the width (proportionate) that is shown and in any event it is expected that the ground speed will be much faster than with the old machine.

The saws 15 and 16, that cut the grain, are equipped with a large number of cutting teeth 19, such as shown in Fig. 6, preferably, according to presently acquired experience, having hooked cutting edges 20 and upstanding spirally shaped vanes 21, which as before stated serve to cancel the natural windage of a high speed saw disc and to throw the shelled grain that may find lodgment on the upper surface of the saw, together with severed heads of grain, towards the centers of the revolving saws and within the influence of the suction nozzle 22 with which the clearance spaces 22a, between the top of the saws and the lower boundary of the leading side of the saw housing 23 are in open communication; hence suction influence from the suction nozzle 22 extends through and beyond the saw housing 23 towards the cutting edges of the saws. The grain separators 24 and 25 serve to define the width of the swath.

Suction energy for the hood 23, the nozzle 22 and the clearances 22a, comes from the suction tube 30 by influence of the high speed suction fan 31, to be hereinafter further referred to.

The suction influence reaches well out over the top surface of the saws which, with the relatively rapid forward speed and the influence of the upstanding vanes 21, practically insures that no grain that rested in the sheath of a head of grain before the impact of the cutting saw that severed it from the straw can be lost. To prevent loss between the saws, the hood extends well past the centers of the saws, referring to their top sides, and in the center it extends out between the approaching arcs of the saws as shown at 23f.

The suction fan (which is also a blower as all such fans are) may have many internal fan arrangements though I prefer at present the ordinary multi bladed fan designed to run at around 2400 revolutions per minute. This fan is wholly encased as shown and is preferably furnished with an independent motor which is diagrammatically indicated by the instrumentality 32.

The reason for an independent motor is that it can run at constant speed which will be important to maintain the suction function, while the speed of the saws may vary as the ground speed of the vehicle upon which the combine is mounted and is not nearly so critical a matter, as will be seen.

The bladed fan, inside the blower 31 and indicated in Fig. 7 by numeral 33 through the broken away aperture in the fan case, threshes the unshelled heads of grain by impacting them against the inside of the fan case as they are thrown tangentially off the blades. This mode of threshing gives every indication, by actual trial, of being very efficient, though, as before indicated, a steady speed seems to be indicated for best results.

The grain which enters the blower 31 through the suction tube 30 remains therein an exceedingly short time, leaving as an agglomeration of straw, chaff and shelled grain, which is much heavier than the other two parts of the mixture and this difference in specific gravity is utilized to separate the grain from the chaff, as has been done from time immemorial, but with a different set of instruments described in another application, the numerals 341, 35 and 40 indicating their general location, only.

It will be observed from the foregoing that I have described my invention. A saw type grain cutter can be adapted to a suction conveyor and only a suction conveyor is suitable to take grain from a saw type cutter, hence a suction type blower and grain thresher can only be used with the before mentioned instrumentalities. It will also be seen that only a suction nozzle pick-up can save very dry grain that is shelled from its husk upon the slightest impact against the straw that carries it, because otherwise there can be no way to avoid the very heavy and expensive waste that accompanies the reciprocating sickle that has otherwise done so much for American agriculture. It is seen, therefore, that the saw-type grain cutter or some substitute of which I am not advised (but not the reciprocating sickle) is an indispensable adjunct of the combined blower and thresher, together with a grain separating device following the thresher, which conceivably may be something else than the cyclone, though I do not know of anything else that is nearly as good.

Having described my invention in such full, clear and exact terms that any person skilled in the manufacture and familiar with the use of harvesting machinery can make and/or use the same, explained its principles and clearly distinguished it from prior reapers, threshers and grain separators, what I claim as new and desire to secure by Letters Patent, is:

1. A harvesting and threshing machine for grain having in combination therewith, a grain cutter comprising a disc mounted for revolution in a horizontal plane, horizontally extending cutting teeth on the perimeter of said disc, a plurality of upstanding vanes, each vane being made rigid with a cutting tooth and having an upstanding leading end positioned immediately beyond the end of the tooth with which it is made rigid, conterminous with the extreme cutting part of such tooth, and a trailing end curved backwards from said leading end to constitute an air moving device when the disc is revolved.

2. A saw-like revoluble cutter for a grain harvesting machine comprising a circular disc mounted for revolution, means for revolving said disc, a plurality of horizontal straw cutting teeth spaced around the outer perimeter of the disc and a plurality of upstanding vanes made rigid with said cutting teeth, one end of each vane conterminous with the end of the tooth with which it is made rigid, the remainder of said vane spiraled inwardly with respect to the perimeter of the cutter to urge air and cut material away from the cutting teeth.

3. A combination harvesting and threshing machine having in combination therewith, a plural toothed horizontal straw cutter, teeth on said straw cutter having horizontal cutting edges, means for running said straw cutter in constant unidirect motion, upstanding vanes on said cutter, said vanes normal to the teeth, made integral with said teeth, and having a thin leading end that is conterminous with the outermost end of the cutting edge with which it is made rigid, and a trailing end curved away, inwardly from the path of said leading end, to throw cut material back clear of the cutter teeth.

4. In combination with a harvesting machine, a straw cutter, means for operating the straw cutter in unidirectional motion at high speed, straw cutting teeth on said cutter in spaced relationship, individual vanes made rigid with said teeth, said vanes vertical, at substantially right angles to the cutting edges of the teeth, the said vanes constituting the extreme outer straw contacting part of the cutter and spiraled to induce air movements and cut material movements in a horizontal direction to clear the said straw cutting teeth.

5. A vehicle mounted combine harvester for pushing forward into standing grain, having in combination therewith, an adjustably carried unidirect grain cutter so mounted on the vehicle that it precedes the vehicle into standing grain, a plurality of unidirectly movable edged cutting knives forming a part of said cutter, means for moving said knives in a horizontal path, upstanding vanes carried by said knives, an edge on each vane substantially angularly conterminous with the edge of the knife that carries the said vane, the remainder of said vane spiraled to throw material cut by the knife and caught by the vane horizontally away from the knife to clear the knife.

6. A combine harvester for standing grain having in combination therewith a plurality of unidirectly movable grain cutter knives, means for driving the knives, upstanding vanes associated with said knives and movable therewith at the same speed to throw cut grain backwards from the knives, said vanes normal to the plane of movement of the knives and curved inwardly with respect to their direction of travel with the knives, the lower tip of each vane being conterminous with the outermost end of the cutting knife with which it is associated.

7. A combine harvester for standing grain having in combination therewith a plurality of horizontal unidirect grain cutter knives, means for driving the knives in a common plane, upstanding vanes mounted in advance of and movable with said knives to throw cut grain backwards from said knives, said vanes diagonal to their path of motion and normal to the plane of the knives, each upstanding vane having an advanced edge, the lowermost part of said edge being conterminous with the most advanced edge of the knife with which it is associated.

FRED H. TEMPLETON.

REFERENCES CITED

The following references are of record in the file of this patent:

UNITED STATES PATENTS

| Number | Name | Date |
| --- | --- | --- |
| 691,846 | Dominy | Jan. 28, 1902 |
| 815,711 | Johnson | Mar. 20, 1906 |
| 1,122,375 | Engle | Dec. 29, 1914 |
| 1,134,443 | Engle | Apr. 6, 1915 |
| 1,336,257 | Muzzy | Apr. 6, 1920 |
| 1,656,105 | Durkee | Jan. 10, 1928 |
| 1,710,611 | Duncan | Apr. 23, 1929 |
| 1,844,750 | Ellis | Feb. 9, 1932 |
| 1,868,918 | Schenk | July 26, 1932 |
| 1,899,564 | Frey | Feb. 28, 1933 |
| 2,005,204 | Poynter | June 18, 1935 |
| 2,071,872 | Cockburn | Feb. 23, 1937 |
| 2,157,619 | McElwain | May 9, 1939 |
| 2,171,750 | Hooe | Sept. 5, 1939 |
| 2,212,465 | Baldwin | Aug. 20, 1940 |